Feb. 6, 1968    K. O. JOHNSON ET AL    3,367,404
RADIAL FLOW REGENERATOR MATRIX FORMED FROM CERAMIC
BLOCKS AND THE METHOD OF MAKING
Filed Dec. 8, 1966    2 Sheets-Sheet 1

INVENTORS
Kenneth O. Johnson, &
Warren E. Meyer

Paul Fitzpatrick
ATTORNEY

INVENTORS
Kenneth O. Johnson, &
Warren E. Meyer

Paul Fitzpatrick
ATTORNEY

3,367,404
RADIAL FLOW REGENERATOR MATRIX FORMED FROM CERAMIC BLOCKS AND THE METHOD OF MAKING

Kenneth O. Johnson, Cincinnati, Ohio, and Warren E. Meyer, Indianapolis, Ind., assignors to General Motors Corporation, Detroit, Mich., a corporation of Delaware
Filed Dec. 8, 1966, Ser. No. 600,074
14 Claims. (Cl. 165—8)

Our invention relates to regenerators, by which we mean devices in which a porous matrix is rotated so as to pass back and forth between two chambers and transfers heat from a fluid which passes through the matrix in one chamber to a fluid which passes through the matrix in the other chamber. Particularly, our improvement relates to a matrix of the radial-flow or drum type, although principles of the invention may have other application. Specifically, our invention relates to a matrix of ceramic material and to an improved and more economical process for manufacturing such a matrix. Further, to ceramic matrices of relatively large size and a process for making these.

Because of the substantial temperature gradients in regenerator matrices, the use of ceramic materials which have extremely low thermal expansion coefficients is very attractive from the standpoint of minimizing thermal distortion and thereby contributing to minimizing seal leakage. Ceramic matrices, both of the disk or axial-flow type and drum or radial-flow type, have been made and tried. Experience has shown that construction of a drum matrix of ceramic material as a single monolithic piece is difficult and the matrices so constructed are extremely expensive. It has occurred to us that such disadvantages could be minimized by fabricating a drum matrix from a porous ceramic slab, and that by taking advantage of principles of construction and manufacture to be explained, a radial-flow matrix of highly desirable characteristics and optionally of large size can be produced much more economically than by conventional laying up of a single ceramic piece which is then fired.

Objects of our invention are to improve the performance of regenerators, to provide a ceramic matrix for radial-flow regenerators at reasonable cost, and to provide a process for making such matrices which creates a minimum of waste, and is economical. Another object of our invention is to provide a matrix in which the areas of the matrix in which flow is blocked are distributed circumferentially around the matrix so as to minimize variations in magnitude or center of effort of pressure exerted on seals through which the matrix passes. A further object is to improve the sealing of regenerators.

The nature of our invention and the advantages thereof will be clear to those skilled in the art from the succeeding detailed description and accompanying drawings of the preferred embodiment of the invention.

Figure 1:
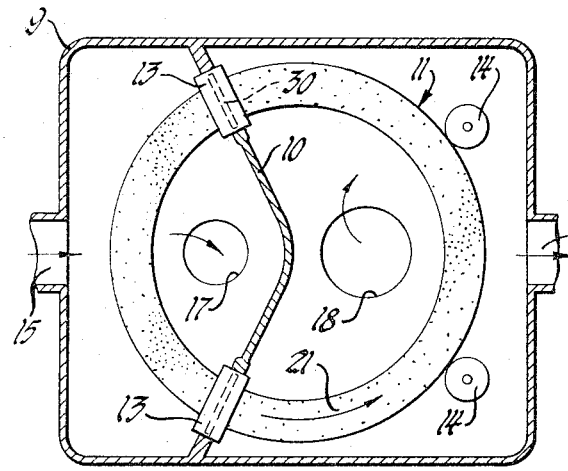
FIGURE 1 is a somewhat schematic illustration of a radial-flow regenerator of known type.

Referring first to FIGURE 1, a typical regenerator comprises a housing 9 divided by a bulkhead 10 into two chambers and an annular matrix 11 mounted to rotate slowly, through openings in seals 13 mounted in the bulkhead, between the two chambers. The matrix may, for example, be supported and driven by rollers 14. A fluid such as compressed air enters the housing through an inlet 15, flows through the forward arc of the matrix and out through a discharge port 17. The other fluid, which may be the compressed air after passing through a combustion chamber and turbine, enters the regenerator through a port 18 to the rear of the bulkhead and flows radially outward through the rear arc of the regenerator to an exhaust 19. Details of such regenerators are shown in United States Patents Nos. 3,057,604 and 3,267,674.

Figure 5:
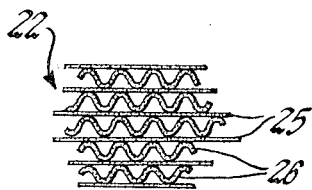
FIGURE 5 is a fragmentary enlargement of FIGURE 2.

The matrix 11 comprises an imperforate ring or rim 21 at each end of the annular drum and a body of porous material 22 between the rims. This porous material is a ceramic material having a structure defining a multiplicity of substantially parallel pores extending from the radially inner to the radially outer surface of the drum. In practice, such a structure is made by laying up alternate layers of thin flat ceramic sheet 25 (FIGURE 5) and a corrugated ceramic sheet 26, the resulting porous material being then fired to provide a unitary material. Such ceramic regenerator structure is obtainable from Corning Glass Works under the trademark "CerCor." United States Patents Nos. 3,112,184 and 3,251,403 are directed to ceramic matrices and techniques for making them. This type of operation is suitable for production of axial-flow matrices in which the flat and corrugated layers may be wound spirally around a core. However, it is difficult and expensive to provide these sheets in the form of rings with the pores radial, which involves a convergence in the width of the corrugations, in a ceramic structure. However, the alternating flat and curved layers can readily be laid up flat to provide a slab of porous material in which the pores extend in parallel relation substantially perpendicularly from one surface of the slab to the other.

Figure 2:
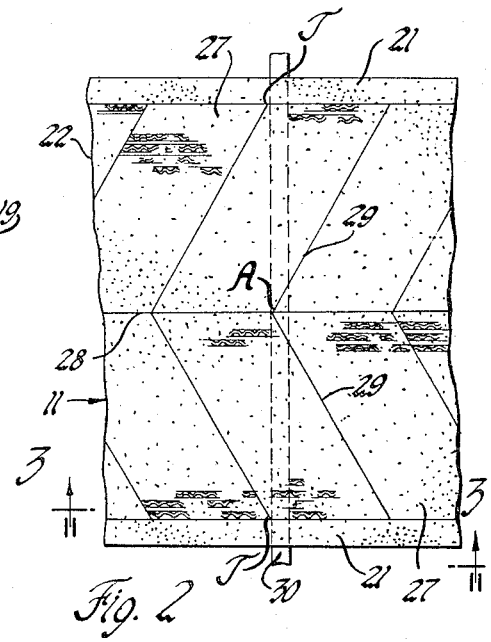
FIGURE 2 is a fragmentary developed view of the outer surface of a matrix.
Figure 3:
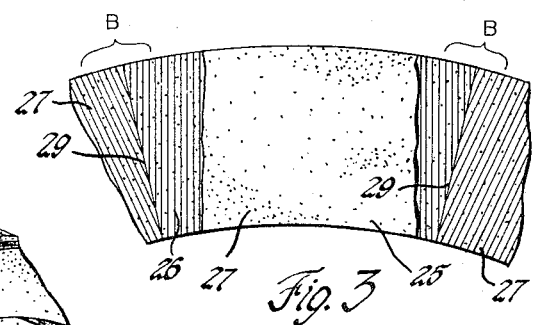
FIGURE 3 is a sectional view taken on the plane indicated by the line 3—3 in FIGURE 2.
Figure 4:
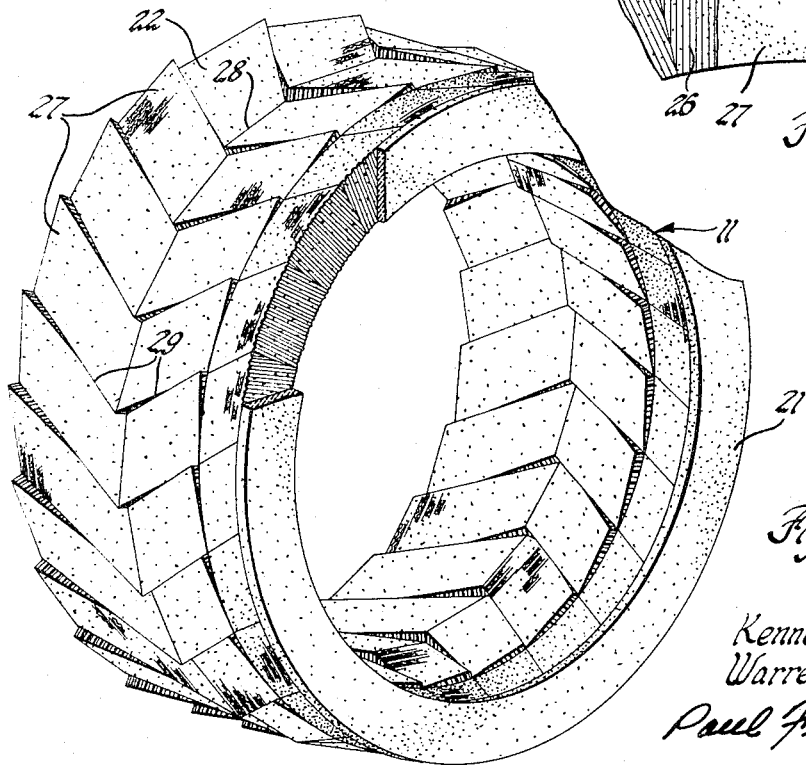
FIGURE 4 is a partial axonometric view, with parts cut away, illustrating the fabrication of the matrix.

In the preferred form of our invention, such a slab of ceramic material, with the pores extending from one face to the other, is cut into blocks or segments which are then cemented together in a ring and machined by grinding to provide the drum of heat transfer material. Preferably, the matrix structure is as illustrated in FIGURES 2 to 4 in which there are two rings of generally parallelogram-shaped segments 27, the rings abutting along a central plane 28 and forming a chevron pattern, as clearly shown in FIGURES 2 and 4. The rims 21, which may be solid rings molded to the desired shape, are cemented to the outer edges of the ring. Obviously, the individual blocks, or some of them, must taper toward the inner surface of the matrix. This is illustrated in FIGURE 3, where the junctions between adjacent segments are indicated at 29. The result of this is, with the structure shown, that the pores at the circumferential margins of each block are dead-ended at the adjacent block, providing a dead zone in the matrix which does not permit flow through the matrix. This dead zone is indicated by the bracket and letter B in FIGURE 3. This leads to the fact that it is desirable that the joints 29 between circumferentially adjacent segments be skewed as indicated in FIGURES 2 and 4 so that the dead zones are distributed evenly around the circumference of the matrix. In FIGURE 2, the outline of a rubbing seal making contact with the outer surface of the matrix is indicated at 30. In this case the seal extends straight across the matrix and the skewing of the segments is such that the apex A of one block is opposite the termination at T of the next adjacent block. In this case the blocked zones are evenly distributed around the circumference of the matrix and the seal always rides on an equal amount of the porous and effectively non-porous parts of the matrix surface. This is valuable because the lift which is exerted by pressure in the matrix on the seal remains constant without wide fluctuations as the dead zones pass under the seal, as would be the case if the blocks were rectangular as viewed in FIGURE 2.

Moreover, preferably two rings of blocks are disposed together in the chevron formation illustrated in FIGURES 2 and 4. There is a practical advantage to the chevron or, for that matter, to a double-chevron or W or any other formation in which the blocked zones are symmetrical with respect to the center plane of the matrix which is the plane 28 of FIGURES 2 and 4. The reason for this is that the lifting force on the seal bar 30 is symmetrical about the center of the seal bar and thus there is no intermittent rocking couple tending to lift one end of the seal bar from the matrix.

FIGURE 4 illustrates the assembly and machining of the matrix. The individual blocks 27 have parallel plane faces where they abut along the center line 28 and where they abut the rim 21. The blocks are laid in a circle on one rim 21, then the second ring of blocks is laid on the first, and the second rim 21 is then put into position. These parts are joined with a suitable high temperature cement. See U.S. Patents 3,112,184 and 3,251,403 with respect to the ceramic technology involved. Thus, a drum having rough inner and outer surfaces is made. To finish the matrix, it is only necessary to machine accurate concentric cylindrical inner and outer surfaces and, if needed, finish the outer faces of rings 21. As illustrated in FIGURE 4, the drum is only partially machined, to make the disclosure more clear.

The ring as illustrated in FIGURE 4 is made up of a large number of blocks and it will be apparent that the greater the number of blocks, the less machining is required, and the less material will be wasted. It is also true that, with a given width matrix, there is less loss of material if the matrix is made up of two or more rings of segments rather than a single ring. The abutting faces 29 of adjacent blocks in a given ring should be of such form as to make close contact over the entire area. Various forms of cuts are possible, but the simplest and most practical is a plane face. Thus, the blocks as cemented into the ring have four plane sides, two of which are parallel and two of which converge, and flat outer and inner surfaces to be machined.

Figure 6:
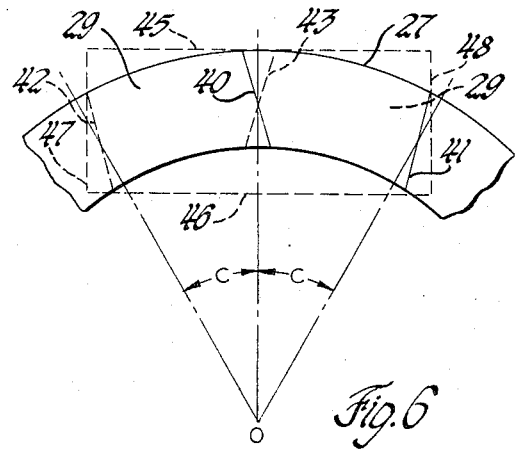
FIGURE 6 is a diagram illustrating the geometry of a matrix block or element.

This preferred geometry is illustrated in FIGURE 6 in which the dotted rectangle represents the outline of the material required to provide a matrix block. The block here illustrated is one which would extend 30° circumferentially and, therefore, a complete ring can be made from twelve blocks as illustrated in FIGURE 6. A larger number is preferable, but the illustration is clearer with the large angle. As illustrated in FIGURE 6, the finished block 27 has cylindrical inner and outer surfaces, a near end face to abut the rim bounded by the edges 40 and 41 and the inner and outer surfaces of the segment, a forward or leading face which is a plane terminating in the edges 40 and 42, a rear or opposite end face defined between the edges 42 and 43, and a trailing face defined between the edges 43 and 41. The inner and outer surfaces of the block have a parallelogram outline. In the specific example, the angle C, which is the circumferential angle subtended by each block is 30°, and thus the block is skewed by an angle 30° around the axis O. Such a segment can be cut from a block or slab having the outline indicated by the dotted lines 45, 46, 47, and 48. Clearly, if the angle C is 15°, for example, instead of 30°, the curvature of the segment will be much less and the waste will be appreciably less. Also, for a given thickness of the original material, a thicker regenerator matrix can be made.

Figure 7:
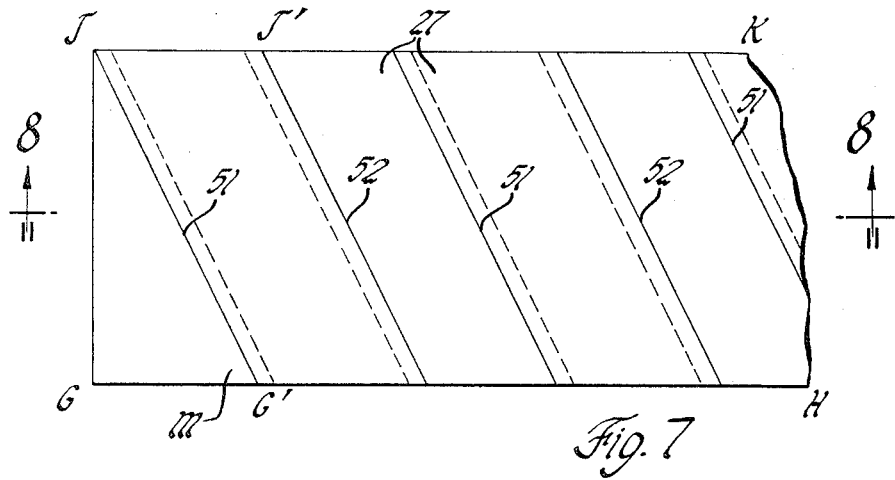
FIGURE 7 is a plan view of a slab of refractory material illustrating a mode of cutting it into matrix blocks.
Figure 8:
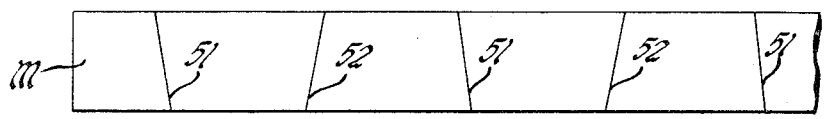
FIGURE 8 is a cross-section of FIGURE 7 taken on the plane indicated by the line 8—8.

FIGURES 7 and 8 illustrate a preferred procedure according to which the matrix blocks are cut from a slab. Assume that the slab is formed or has been cut so that its width, that is, the vertical dimension as shown in FIGURE 7, equals the width from the matrix rim to the center line 28 and that the two side faces or edges are plane and parallel, the block can be sawed with a minimum of waste into the rough segments 27. Cuts 51 and 52 are made across the block so that all of the cuts make the same angle with the edges GH and JK and the distance GG′ equals the distance JJ′, and so on. As will be apparent from FIGURE 8, cuts 51 and 52 make equal angles with the upper and lower surfaces of the block, but are oppositely inclined in the plane of FIGURE 8. The angle of each cut to a perpendicular between the two surfaces is an integral fraction of a whole angle so that when the blocks of each alternate set are assembled together into a ring, each segment will fit into the same integral fraction of the circle. Clearly, alternate blocks are left and right hand to each other and, therefore, each set of blocks may be used for a separate matrix, one being opposite-handed to the other or preferably for the two rows of a chevron configuration.

It should be clear from the foregoing that our invention makes feasible the use of a ceramic material for a radial-flow regenerator. The matrix material may be easily made with parallel pores or passages for the gas and may be made in slabs of reasonable size. From these slabs the individual blocks are readily sawed and cemented together. It is possible, of course, to make the original slabs of a generally parallelogram configuration so as to reduce the amount which needs to be cut away as represented, for example, by the generally triangular portion M in FIGURES 7 and 8. The layers 25 and 26 of the ceramic could be disposed transversely or in a skewed direction to the movement of the matrix but preferably are in planes perpendicular to the axis of rotation.

The detailed description of the preferred embodiment of the invention for the purpose of explaining the principles thereof is not to be considered as limiting or restricting our invention, since many changes may be made by the exercise of skill in the art.

We claim:

1. A radial-flow regenerator matrix comprising an annular heat-transfer matrix body the radially inner and outer surfaces of which are surfaces of revolution about a common axis,
   the matrix body being defined by a ring of blocks abutting circumferentially and joined rigidly together,
   each block having a structure defining a multiplicity of substantially parallel pores extending generally radially with respect to the said axis through the block,
   each circumferentially adjacent pair of blocks defining a marginal area at the junction of the blocks in which the pores of at least one of the blocks are dead-ended against the adjacent block due to the lesser circumference of the inner surface than that of the outer surface.

2. A matrix as recited in claim 1 in which the blocks have a parallelogram outline as viewed from the axis with the abutting faces of the blocks skewed with respect to the axis to such an extent that each said marginal area originates at one end of the body at the same circumferential position as the termination of the next adjacent marginal area at the other end of the body.

3. A matrix as recited in claim 2 in which the said abutting faces are plane.

4. A matrix as recited in claim 2 in which the said abutting faces are radial with respect to the said axis.

5. A matrix as recited in claim 2 in which the pores extend radially adjacent the middle of the block circumferentially and there is a said marginal area at each junction extending over both adjacent blocks.

6. A matrix as defined in claim 2 in combination with a second matrix as defined in claim 2, the two said matrices being fixed together coaxially to define a single drum, the said matrices being mirror images of each other so that the marginal areas are in a chevron pattern with the apex of each chevron at the same circumferential position as the outer ends of the next adjacent marginal area.

7. A matrix as defined in claim 6 in combination with a housing, bulkhead means dividing the housing into two fluid passage zones, means including seals providing openings between the zones, the matrix extending through the said seals, the width of the seal at the outer surface of the matrix being substantially constant from end to end of the matrix.

8. A matrix as defined in claim 2 in combination with a housing, bulkhead means dividing the housing into two fluid passage zones, means including seals providing openings between the zones, the matrix extending through the said seals, the width of the seal at the outer surface of the matrix being substantially constant from end to end of the matrix.

9. A matrix as recited in claim 1 in which the pores extend radially adjacent the middle of the block circumferentially and there is a said marginal area at each junction extending over both adjacent blocks.

10. A radial-flow regenerator matrix comprising an annular heat-transfer matrix body the radially inner and outer surfaces of which are surfaces of revolution about a common axis, the matrix having a structure defining a multiplicity of pores extending generally radially with respect to the said axis from the inner to the outer surface of the matrix, the matrix having structure defining non-porous zones extending across at least one of said surfaces in an axial direction, the last-mentioned structure being skewed with respect to the axis with each said zone terminating at the same circumferential position as the origination of the next said zone, so that the total area of the non-porous zones is evenly distributed around the circumference of the matrix.

11. A matrix as recited in claim 10 in which the skewed structure is in a chevron or herringbone pattern.

12. A matrix as recited in claim 10 in which the non-porous zones are symmetrical with respect to a central plane normal to the axis.

13. A method of constructing an annular drum from a block of material having substantially parallel surfaces and having pores extending in substantially parallel relation from one to the other surface comprising the following steps:

establishing a first plane side face on said block substantially normal to the said surfaces establishing a second plane side face on said block parallel to said first side face and spaced from the first face a distance equal to an integral fraction of the desired axial length of the drum cutting the block into equal segments by plane cuts extending from one face to the other, the said cuts making equal angles in the said surfaces with the said faces and alternate cuts being equally but oppositely inclined from a normal to said surfaces the angle between adjacent cuts in the plane of the faces being an integral fraction of a whole angle, assembling alternate blocks into a ring with the faces defined by the said plane cuts abutting, and machining the inner and outer surfaces of the ring.

14. A method comprising the steps recited in claim 13 and additionally the steps of:

assembling a second ring by the steps recited in claim 13 assembling the two rings edge-to-edge to form a single annulus, and machining the inner and outer surfaces of the second ring along with those of the first-recited ring.

References Cited

UNITED STATES PATENTS

| | | | |
|---|---|---|---|
| 2,706,109 | 4/1955 | Odman | 165—10 X |
| 3,061,822 | 3/1963 | Wolansky et al. | 165—10 |
| 3,101,778 | 8/1963 | Hazzard et al. | 165—10 |
| 3,112,184 | 11/1963 | Hollenbach | 156—89 X |
| 3,251,403 | 5/1966 | Smith | 165—10 |

ROBERT A. O'LEARY, *Primary Examiner.*

A. W. DAVIS, JR., *Assistant Examiner.*

UNITED STATES PATENT OFFICE
CERTIFICATE OF CORRECTION

Patent No. 3,367,404                          February 6, 1968

Kenneth O. Johnson et al.

It is certified that error appears in the above identified patent and that said Letters Patent are hereby corrected as shown below:

Column 6, line 39, "3,061,822" should read -- 3,081,822 --.

Signed and sealed this 17th day of February 1970.

(SEAL)
Attest:

Edward M. Fletcher, Jr.                  WILLIAM E. SCHUYLER, JR.
Attesting Officer                         Commissioner of Patents